(12) United States Patent
Furuta et al.

(10) Patent No.: US 6,491,768 B1
(45) Date of Patent: Dec. 10, 2002

(54) ANTI-FRICTION BEARING AND METHOD FOR FABRICATING ANTI-FRICTION & BEARING

(75) Inventors: Tokushichi Furuta, Nagano-ken (JP); Shigenori Hoya, Nagano-ken (JP); Takaaki Tsuda, Nagano-ken (JP); Yutaka Daikuhara, Nagano-ken (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 09/522,685

(22) Filed: Mar. 10, 2000

(30) Foreign Application Priority Data

Mar. 12, 1999 (JP) .............................. 11-109926
Nov. 4, 1999 (JP) ........................... 11-313227

(51) Int. Cl.$^7$ ............................ C12D 9/36; C12D 9/40; C22C 38/18

(52) U.S. Cl. ..................... 148/333; 148/906; 148/663; 384/912

(58) Field of Search ................................ 148/333, 906, 148/579, 589, 663; 384/625, 912

(56) References Cited

U.S. PATENT DOCUMENTS

| | | |
|---|---|---|
| 2,325,088 A | 7/1943 | Wright et al. |
| 4,992,111 A | 2/1991 | Yamada et al. |
| 5,800,637 A | 9/1998 | Yamamura et al. |
| 6,267,511 B1 * | 7/2001 | Takemura et al. .......... 420/104 |

FOREIGN PATENT DOCUMENTS

| | | |
|---|---|---|
| EP | 0 337 639 | 4/1989 |
| EP | 0 718 513 A1 | 6/1996 |
| EP | 0 825 270 A1 | 2/1998 |
| FR | 2766748 | 2/1999 |
| GB | 2328479 | 2/1999 |
| JP | 362218542 A * | 9/1987 |

* cited by examiner

*Primary Examiner*—Deborah Yee
(74) *Attorney, Agent, or Firm*—Staas & Halsey LLP (57) ABSTRACT

A bearing and a method for fabricating a bearing. The bearing is intended to be used in office automation equipment and the like is improved in impact resistance and load capacity. Its rotational accuracy will not deteriorate in long-term use and its quietness can be maintained over a long period of time. The bearing is an anti-friction bearing located between portions supporting a load and in relative motion to each other. The anti-friction bearing has an outer ring of 30 mm or less in diameter, in which high carbon chromium bearing steel constituting the anti-friction bearing includes the following compositions: C of 0.90–1.30 wt %, Si of 0.40–1.20 wt %, Mn of 0.90–1.0 wt %, and Cr of 0.90–1.70 wt %. After quenching, the tempering temperature used for this bearing is maintained in the range of 170° C. and 250° C. so that the amount of retained austenite in the surface layer after heat treatment is stabilized at 6 by volume or less.

12 Claims, 6 Drawing Sheets

FIG. 1

FIG. 3
COMPOSITION COMPARISON

| | C | Si | Mn | P | S | Cr | Cu | Ni | Mo |
|---|---|---|---|---|---|---|---|---|---|
| SUJ2 | 0.95~1.10 | 0.15~0.35 | 0.50 OR LESS | 0.025 OR LESS | 0.025 OR LESS | 1.30~1.60 | 0.25 OR LESS | 0.25 OR LESS | 0.08 OR LESS |
| MATERIAL OF THE PRESENT INVENTION | 0.90~1.30 | 0.40~1.20 | 0.90~1.60 | - | - | 0.90~1.70 | - | - | 0.25 OR LESS |
| TEST MATERIAL 1 | 0.97 | 0.63 | 1.10 | 0.008 | 0.007 | 1.09 | 0.06 | 0.05 | 0.05 |
| TEST MATERIAL 2 | 0.96 | 0.60 | 1.18 | 0.010 | 0.005 | 1.50 | 0.06 | 0.05 | 0.04 |

ANTI-FRICTION BEARING AND METHOD FOR FABRICATING ANTI-FRICTION & BEARING

BACKGROUND OF THE INVENTION

1. Field of the Invention

The invention relates to an anti-friction bearing, and more particular to an anti-friction bearing which is high in resistance to impact, improved in load capacity, and has less tendency to produce increased sound levels as it ages; and a method for fabricating the same.

2. Description of the Related Art

Anti-friction bearings have been conventionally used for rotating parts in various mechanisms. In recent years, due to the rapid diffusion of office automation equipment, the ball bearing type of anti-friction bearing has increased in importance as the bearings for electric devices used in office automation equipment such as video cassette recorders (VCRs), floppy disk drives (FDDs), hard disk drives (HDDs), and scanner motors, to such an extent that the characteristics of the ball bearings influence the characteristics of the equipment. For example in the case of driving 3.5 inch HDDs., the bearings used for the motors cannot cope with this amount of downsizing unless they have a diameter of 15 mm or less. Moreover, even those to be used for VCRs and scanner motors require a diameter not greater than 30 mm.

As described above, ball bearings have become smaller in outer diameter to meet the shrinking size of office automation equipment. In addition, with the miniaturization and the increase in track density of HDDs, the ball bearings used therein must meet more severe requirements for improved rotational accuracy (with long-term retention of this rotational accuracy), improved impact resistance and load capacity. Especially, to meet the recent trend for Personal Computer (PC) notebooks and mobile computing, further improvements are required in impact resistance and load capacity.

For higher load capacities, the material constituting the ball bearing should be harder. For ball bearings constructed conventionally from Type 2 high carbon chromium bearing steel (SUJ2), tempering is normally performed in the temperature range 160 to 200° C. in order to give the ball bearings a hardness of HRC58 or more. However, although such low tempering temperatures result in higher hardness, they also yield a great amount of retained austenite. This austenite is unstable, and there is a high possibility that the austenite will be transformed into martensite during use, producing strain which will increase noise levels.

To lower austenite levels, the tempering temperature has conventionally been raised, even though the ball bearing is therefore softer and has a reduced load capacity, in order to reduce the amount of retained austenite and minimize changes with age.

SUMMARY OF THE INVENTION

The present invention aims to improve such conventional disadvantages, and an object thereof is to provide a bearing to be used in office automation equipment and the like, wherein the impact resistance and load capacity are improved, the rotational accuracy will not deteriorate in long-term use and the quietness can be maintained over a long period of time.

Bearings are used under various conditions and at various temperatures, and they must not change their dimensions (measured at a given temperature) even after having been used at various temperatures. However, even a bearing made from steel hardened at an appropriate temperature and tempered properly can suffer great dimensional changes in a short period of time when, for example, the bearing is operated beyond its maximum operating temperature. These dimensional changes are also influenced by stresses imposed on portions of the bearing. A cause of the dimensional changes is the retained austenite in the bearing material.

That is, in hardened bearing steel, the retained austenite appears to decompose under the influence of temperature and time, expanding in volume to produce dimensional changes. For example, in a case where a bearing in an operating HDD is subjected to extreme impacts or loads for even a short period of time, frictional heat elevates the temperature of the affected portion beyond the upper limit of the design specification temperature, and the heat decomposes the retained austenite to rapidly produce dimensional changes. Moreover, even in cases where the elevated temperature does not exceed the specification, the application of excessive stresses causes the decomposition of retained austenite to produce dimensional changes over time. These dimensional changes cause production of noise from the bearing as well as shorten the life of the bearing.

In a conventional small size bearing having an outer diameter of 30 mm or less, Type 2 high carbon chromium bearing steel (SUJ2), is normally used as both the the bearing ring and the ball bearing. The chemical compositions of SUJ2 are as follows:

C: 0.95–1.10 percent by weight (Wt %),
Si: 0.15–0.35 wt %,
Mn: 0.50 wt % or less,
P: 0.025 wt % or less,
S: 0.025 wt % or less, and
Cr: 1.30–1.60 wt %.

When the above material is quenched and them tempered at a temperature between 160 and 200° C., the amount of retained austenite in the bearing is as high as 8–14 by volume %. Thus, a bearing using Type 2 high carbon chromium steel suffers from great dimensional changes resulting from the aforesaid decomposition of retained austenite . When the bearing is used as a bearing for a HDD, stable use over a long period of time cannot be expected of the bearing. To avoid such problems, retained austenite may be reduced by raising the tempering temperature or by repeating the tempering process, as described in Japanese Patent Laid-Open Publication No. Hei 7-103241. However, like the repetition of the tempering over a plurality of times, the processing steps are complicated, which inevitably increases the man-hours required.

Accordingly, in the present invention, as compared with the chemical composition of the SUJ2, Mn (an austenite stabilizer) can be increased to form retained austenite which is stabler even at lower tempering temperatures, Si, which has high temper softening resistance, is added in increased amounts to suppress the lowering hardness at higher temperatures . Lastly, the range of the Cr content is enlarged in order to widen the quenchability range.

The chemical compositions of the high carbon chromium bearing steel to be used in the present invention are as follows:

C: 0.90–1.30 wt %,
Si: 0.40–1.20 wt %,
Mn: 0.90–1.60 wt %,
Cr: 0.90–1.70 wt %, and impurities of P: 0.025 wt % or less, and S: 0.025 wt % or less.

In view of the technical circumstances as described above, the invention according to claim 1 of the present application provides an improved anti-friction bearing. The improved bearing functions by means of rolling between portions supporting a load. The portions are in relative motion to each other. An inventive anti-friction bearing having an outer ring of 30 mm or less in diameter, wherein the high carbon chromium bearing steel constituting said anti-friction bearing is made from material which includes the following compositions, and which has an amount of retained austenite in its surface layer of less than 6% by volume.

C : 0.90–1.30 wt %,

Si: 0.40–1.20 wt %,

Mn: 0.90–1.60 wt %, and

Cr: 0.90–1.70 wt %.

In addition, another example of the present application provides a method for fabricating an anti-friction bearing, being a bearing functioning by means of rolling movements between portions supporting a load and which are in relative motion to each other, said anti-friction bearing having an outer ring of 30 mm or less in diameter, wherein the high carbon chromium bearing steel constituting the anti-friction bearing uses a material including C: 0.90–1.30 wt %, Si: 0.40–1.20 wt %, Mn: 0.90–1.0 wt %, and Cr: 0.90–1.70 wt %; and where weight determinations are performed after quenching, at a tempering temperature in the range of 170° C.–250° C., the amount of retained austenite in its surface layer is less than 6 by volume % after the tempering, and the surface hardness is HRC60 or greater.

The nature, principle and utility of the invention will become more apparent from the following detailed description when read in conjunction with the accompanying drawings.

DETAILED DESCRIPTION OF THE PREFERRED EMBODIMENTS

Next, the embodiment of the present invention will be described in detail.

Figure 1:
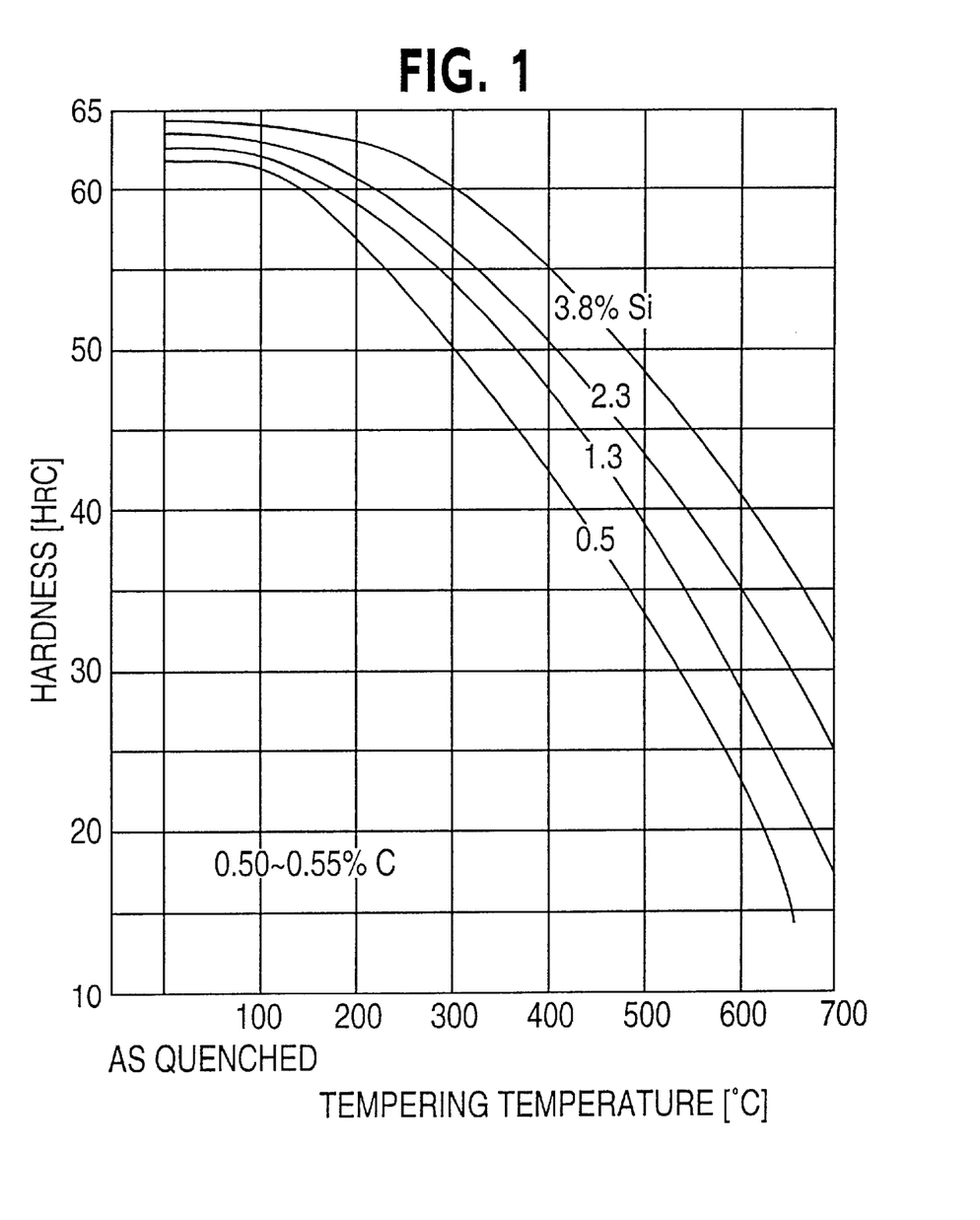
FIG. 1 is a chart showing the influence of Si on temper hardness.

First, a description of the influence of Si on temper hardness with respect to high carbon chromium bearing steels. To take an example, E. C. Bain, and H. W. Paxten: "Alloying Elements in Steel," ASM (1961) describes variations in temper hardness of 0.5 wt % carbon steel with Si added. The base steel used therein is S50C–S55C, the added amount of Si is 0.5 wt %, 1.3 wt %, 2.3 wt %, or 3.8 wt %, and the tempering temperature ranges from 100° C. to 700° C. FIG. 1 is a characteristic chart showing the relation of the hardness with respect to the tempering temperatures in this test. As described above, the greater is the amount of Si added to the steel, the smaller are the decreases in hardness even at high tempering temperatures.

With the above in mind, the present inventors made two test materials with increased Si content as compared with the aforesaid Type 2 high carbon chromium bearing steel for small size bearings (SUJ2).

The chemical compositions of the test material 1 are shown below.

C: 0.97 wt %

Si: 0.63 wt %

Mn: 1.10 wt %

P 0.008 wt % or less

S: 0.007 wt % or less

Cr: 1.09 wt %

Cu: 0.06 wt % or less

Ni: 0.05 wt % or less

Mo: 0.05 wt % or less

Now, the chemical compositions of the test material 2 are shown below.

C: 0.96 wt %

Si: 0.60 wt %

Mn: 1.13 wt %

P: 0.010 wt % or less

S: 0.005 wt % or less

Cr: 1.50 wt %

Cu: 0.06 wt % or less

Ni: 0.05 wt % or less

Mo: 0.04 wt % or less

Figure 2:
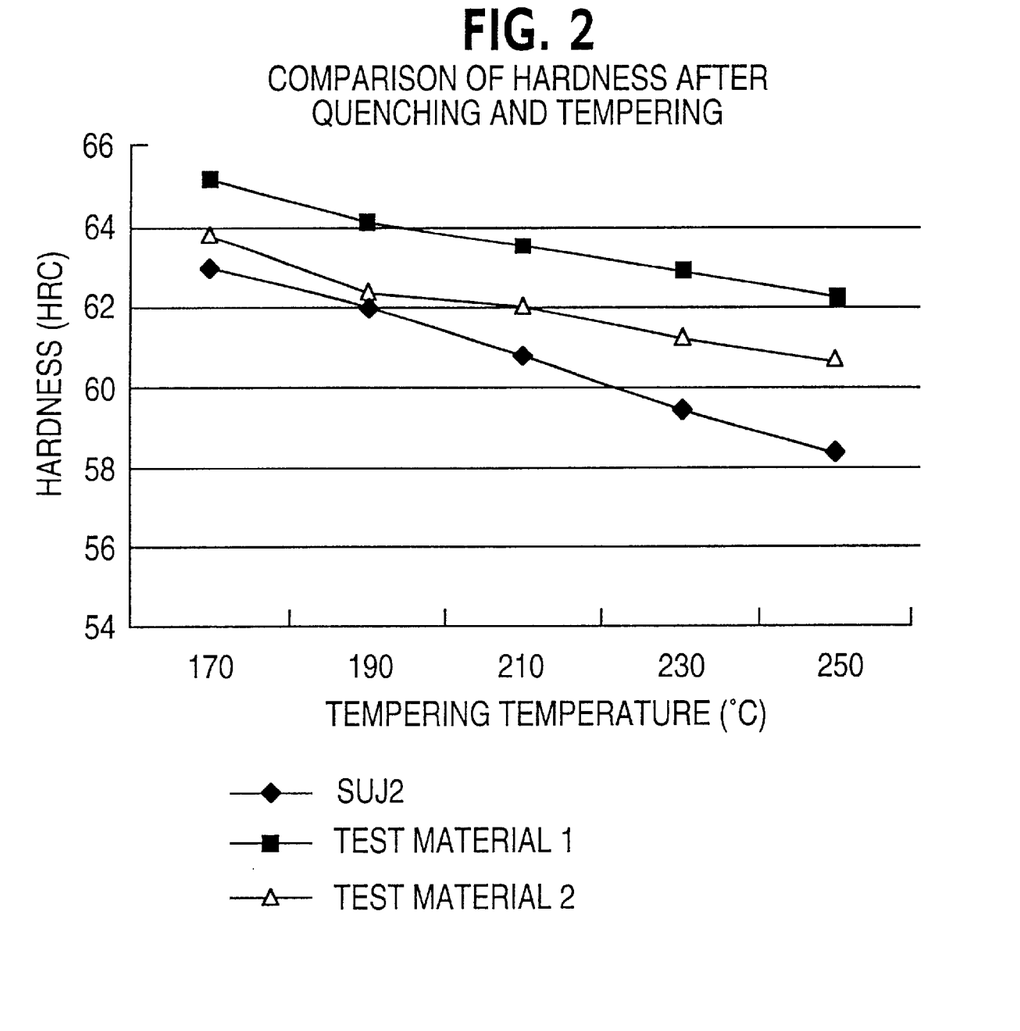
FIG. 2 is a chart showing the relation between tempering temperatures and hardness with respect to materials.

FIG. 2 is a chart illustrating the comparison of hardness after hardening and tempering, measured on the aforesaid high carbon chromium bearing steel test material 1, test material 2, and the SUJ2 test material. As shown in FIG. 2, test material 1 at tempering temperatures ranging from 170° C. to 250° C. was in the range of 65 and 62 HRC in hardness. The test material 2 was in the range of 64 and 61 HRC in hardness. In contrast, the SUJ2 material was in the range of 63 and 58 HRC in hardness. Thus, as compared with the other materials, test material 1 can keep higher hardness at the same tempering temperatures. Test material 2 showed the next best results after test material 1. In this connection, the temperature of the aforesaid quenching was 790° C. through 860° C. for each material, and the sub zero processing temperature was −80° C.

Figure 3:
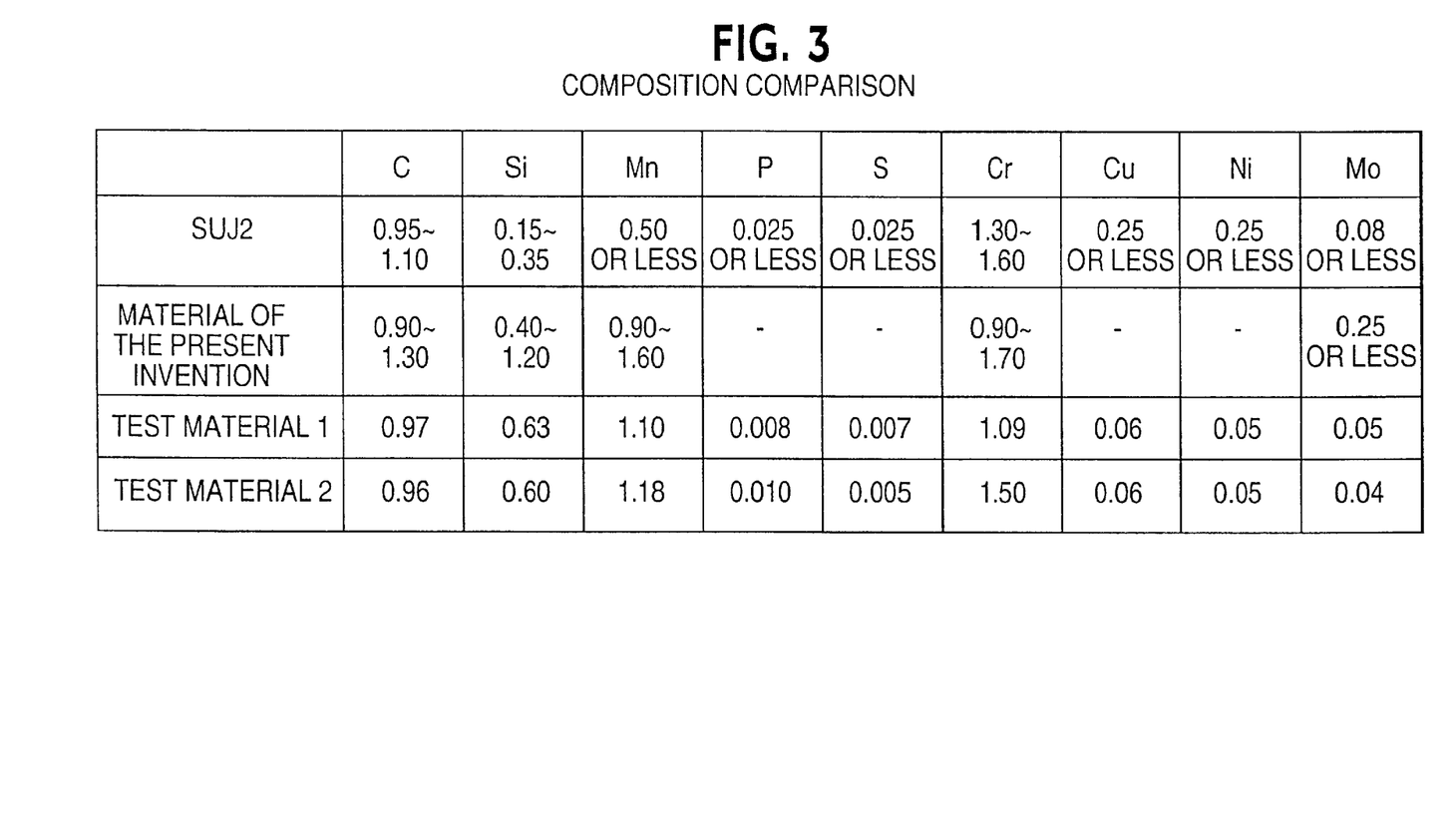
FIG. 3 is a table showing the compositions of the bearing steel materials.

FIG. 3 shows the chemical compositions of the aforesaid test materials 1 and 2, SUJ2, and of the present invention.

Figure 4:
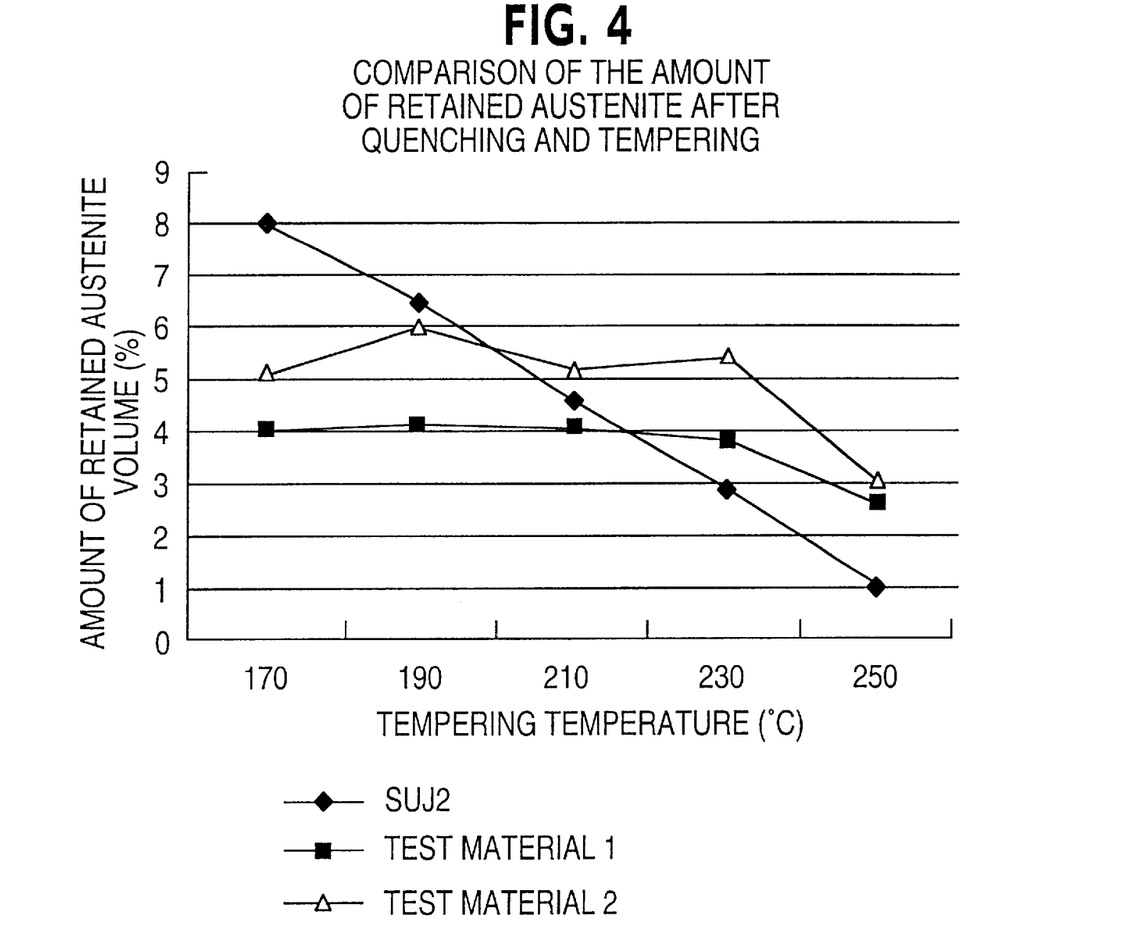
FIG. 4 is a chart showing the amount of retained austenite after tempering.

As mentioned before, for the minimization of dimensional changes over time resulting from the decomposition of retained austenite, the amount of retained austehite remaining in the high carbon chromium bearing steel after quenching and tempering should be as small as possible, and it is preferable that the amount of retained austenite should be approximately the same over a wide range of tempering temperatures. FIG. 4 is a chart showing a comparison among the amounts of retained austenite in the aforesaid three test materials after quenching and tempering.

As seen in FIG. 4, the SUJ2 test material, had an amount of retained austenite as high as 8 by volume %, despite the low tempering temperature of 170° C. Also, in the SUJ2 test material, the amount of retained austenite sharply decreased as the tempering temperature increased. This means that a desired amount of retained austenite in the known SUJ2 can be obtained only through precise control of the tempering temperature, and that the temperature must be maintained at a high level at the expense of the hardness after tempering, in order that the amount of retained austenite after quenching is reduced to the extent allowable for practical use.

In contrast, test material 2 had an amount of retained austenite of 5–6 by volume % at tempering temperatures ranging from 1.70° C. to 230° C., and 3 by volume % at 250° C. According to the aforesaid results, test material 1 had a small amount of retained austenite after tempering, and was generally constant in the amount of retained austenite even when the tempering temperature was varied from 170° C. to 250° C. This shows that test material 1 can minimize the dimensional changes over time resulting from the decomposition of retained austenite. Test material 2 showed the next best results after test material 1.

Addition of Mn to high carbon chromium bearing steel provides the formation of retained austenite which is stable even at lower tempering temperatures. Test materials 1 and 2 had an increased amount of Mn added as compared with the chemical composition of the aforesaid SUJ2 as shown in FIG. 3. Moreover, the range of Cr content was enlarged to widen the range of the quenchability multiple, facilitating the spheroidizing of carbides.

For large size and super size bearings of larger diameter, Type 3 (SUJ3) or D1NI.3520 Mod. high carbon chromium bearing steel is generally used, and SUJ3 generally contains a greater amount of Si and Mn than SUJ2 steel, and has increased quenchability. The chemical compositions thereof are shown below.

The Chemical Compositions of SUJ3

C: 0.95–1.10 wt %
Si: 0.40–0.70 wt %
Mn: 0.90–1.15 wt %
P: 0.025 wt % or less
S: 0.025 wt % or less
Cr: 0.90–1.20 wt %
Cu: 0.25 wt % or less
Ni: 0.25 wt % or less
Mo: 0.08 wt % or less The Chemical Compositions of D1NI.3520 Mod.

C: 0.90–1.30 wt %
Si: 0.60–1.20 wt %
Mn: 1.10–1.60 wt %
Cr: 1.30–1.70 wt %

Further, for use as automobile bearings an anti-friction bearing, for example as described in Japanese Patent Laid-Open Publication No. Hei 6-25799, can be used to provide long life even where lubrication contaminated by foreign substances is used. The chemical compositions of the high carbon chromium bearing steel used in said anti-friction bearing steel used in said anti-friction bearing are as follows:

c: 1.1–1.36 wt %
Si: 0.50–0.8 wt %
Mn: 0.5–1.5 wt %
Cr: 1.3–3.0 wt %
Mo: 0.6 wt % or less The chemical compositions of the aforesaid mentioned test material 1 are included in the chemical compositions of SUJ3. Therefore, the function and effect of test material 1 are also obtained from the SUJ3 high carbon chromium bearing steel having the aforesaid chemical compositions.

Similarly, the chemical compositions of test material 2 are included in the chemical compositions of D1NI.3520 Mod. Therefore, the function and effect of the test material 2 are also obtained from the D1NI.3520 Mod. high carbon chromium bearing steel having the aforesaid chemical compositions.

Moreover, in hardened steel, two or more types of alloying elements, when added in combination, can provide a multiplied effect. Accordingly, for an anti-friction bearing in which the high carbon chromium bearing steel constituting the bearing includes the compositions:

C: 0.90–1.30 wt %,
Si: 0.40–1.20 wt %,
Mn: 0.90–1.60 wt %, and
Cr: 0.90–1.70 wt %, when the tempering temperature in processing this bearing is maintained within the range of 170° C. and 250° C., this bearing provides the function and effect to achieve the aforesaid object of the present invention.

The range of chemical compositions of the anti-friction bearing described above in the present invention covers the same range as the chemical compositions of the high carbon chromium bearing steel described in Japanese Patent Laid-Open Publication No. Hei 6-25799. However, in that patent, the anti-friction bearing using high carbon chromium bearing steel is processed so that the amount of retained austenite in the surface layer of the bearing after quenching and tempering is within a specified range of 13 to 20 vol %. By contrast, the anti-friction bearing of the present invention, including the above mentioned chemical compositions, is given a heat treatment in the temperature range 170 to 250° C., the result of which is to achieve a stabilized amount of retained austenite of 6 vol % or less. Both the objectives and the effective results of the present invention mean that this antifriction bearing is different from the prior art.

Figure 5:
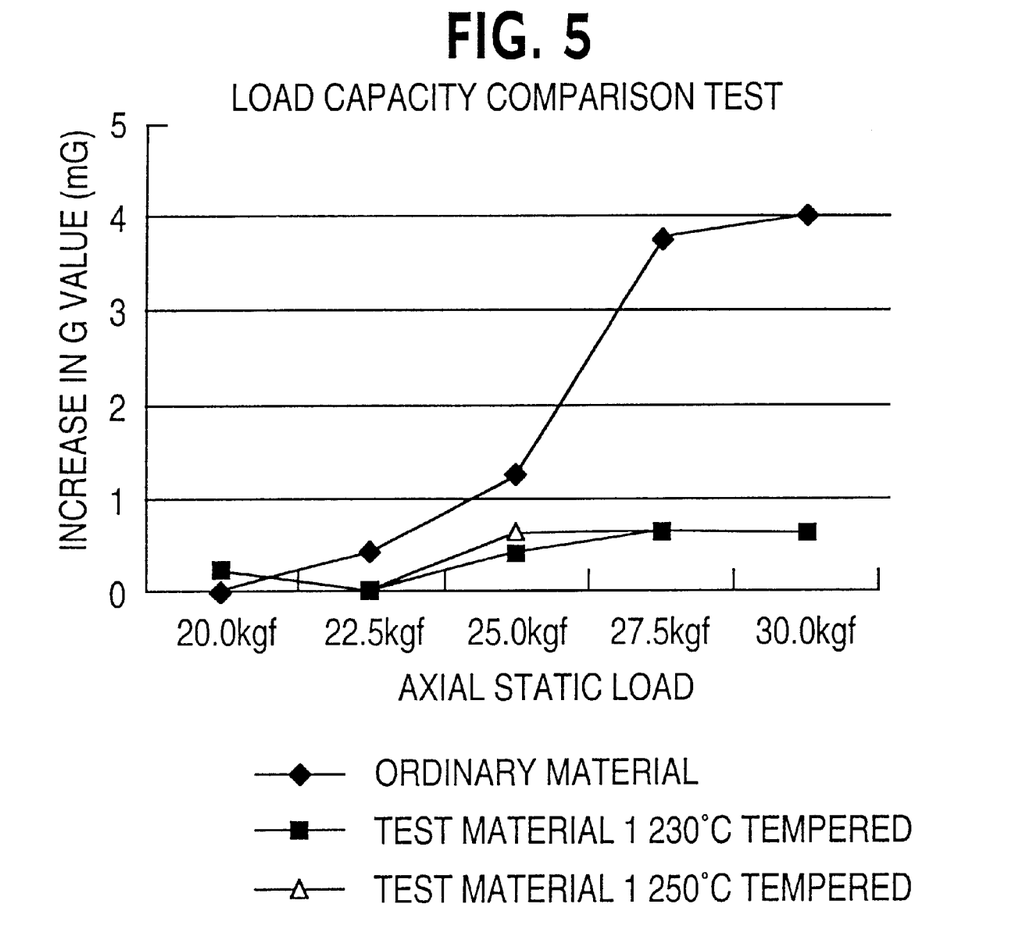
FIG. 5 is a chart showing increases in G value in response to static loads on bearings.

Next, a description will be given of the load capacity characteristics with respect to bearings made from the aforesaid test material 1 and SUJ2 (ordinary material) and having a diameter of 30 mm or less. FIG. 5 is a chart showing the increased amounts of G values when axial static loads were applied to the bearings. As seen from this figure, the bearing using the SUJ2 material (ordinary material) soared in G value when the imposed axial static load exceeded 25 kgf, while those using test material 1 and having been tempered at 230° C. or 250° C. exhibited a rise remaining within 1 in G value even under axial static loads up to 30.0 kgf.

Figure 6:
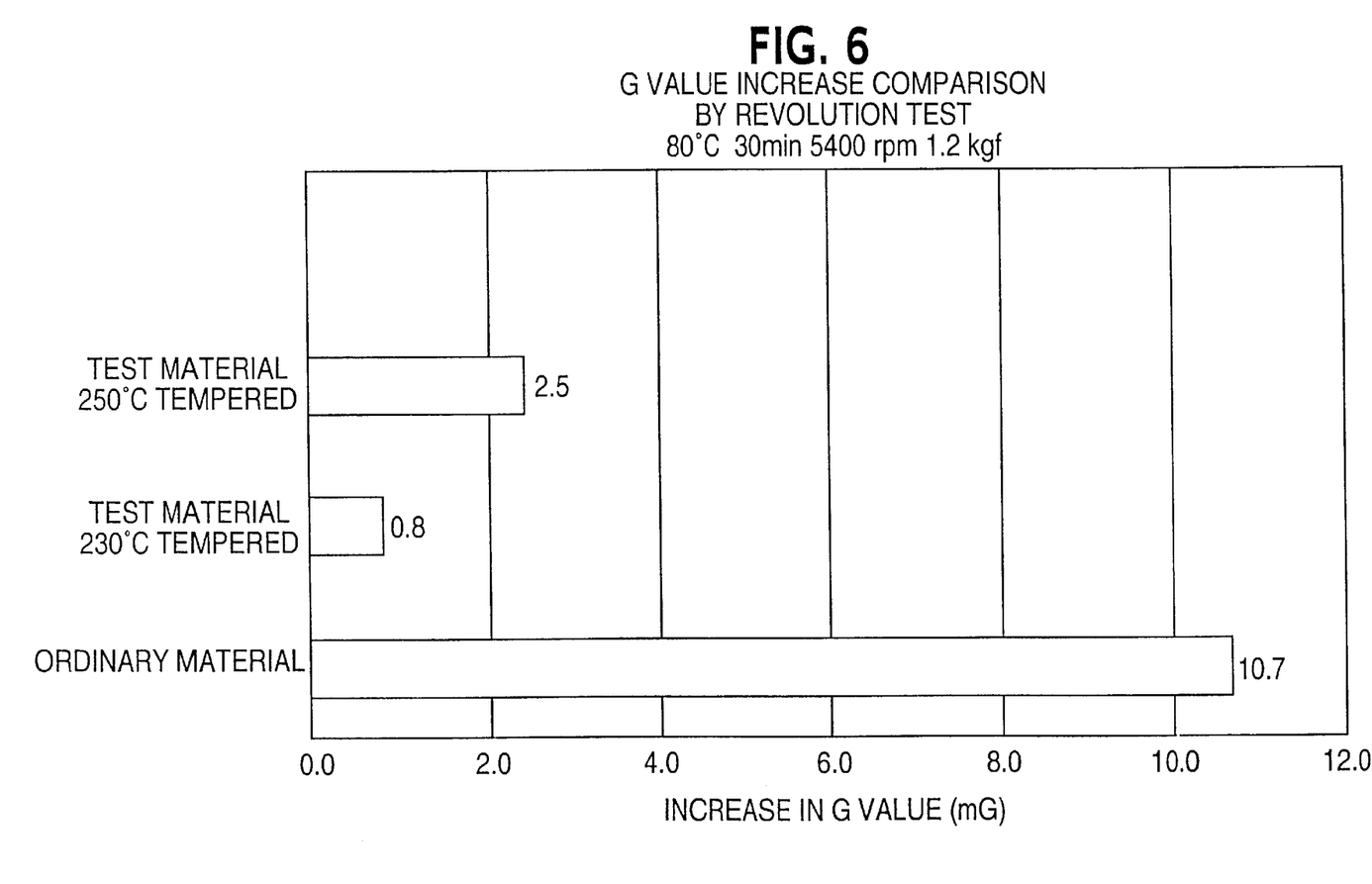
FIG. 6 is a chart showing increases in G value of bearings by high-speed revolution tests.

FIG. 6 is a chart showing the results of high-speed revolution tests with respect to the same bearings as those in FIG. 5. As seen from this figure, the bearing using the SUJ2 material (ordinary material) increased in G value up to 10.7 mG under the revolution test in an 80° C. atmosphere, at an axial load of 1.2 kgf, at 5400 rpm for 30 minutes. Meanwhile, those using the test material 1, having been tempered at 230° C. or 250° C., exhibited G-value increases of 0.8 and 2.5 mG, respectively.

Moreover, small size bearings having a diameter of 13 mm were actually mounted on a hard disk drive comprising two magnetic disks and a life expectancy test was performed. The test results showed that 18-hour continuous running produced a noise level of 26.65 dB(A) or less, 100-hour continuous running a noise level of 27.79 dB(A) or less, 180-hour continuous running a noise level of 27.91 dB(A) or less, and 600-hour continuous running a noise level of 29.5 dB(A).

As described above in detail, the first embodiment of the invention can suppress retained austenite to as low as 6 by volume % or less in a small size bearing to be used in office automation equipment and the like, the bearing having a diameter of 30 mm or less. This can minimize the dimensional changes over time resulting from the decomposition of retained austenite, so that the impact resistance and load capacity of a bearing can be improved to obtain a bearing with high stability and quietness for long-term use.

Moreover, the invention according another embodiment of the present application can keep the amount of retained austenite constant even at a wider range of tempering temperatures, enhancing the degree of freedom in controlling the tempering temperature.

What is claimed is:

1. A method for fabricating an anti-friction bearing for electric devices used in office automation equipment, comprising the steps of:

forming at least an outer ring and an inner ring of the anti-friction bearing using bearing material including
    C: 0.90–1.30 wt %,
    Si: 0.40–0.90 wt %,
    Mn: 0.90–1.60 wt %, and
    Cr: 0.90–1.70 wt %; and tempering the bearing at a temperature in the range of 170° C. and 250° C., such that the amount of retained austenite in a surface layer thereof is less than 6 percent by volume and a hardness of said surface layer is HRC 60 or more after said tempering.

2. The method of claim 1, further comprising the step of forming the outer ring to have a diameter of less than 30 millimeters.

3. The method of claim 1, further comprising the step of forming the material with P: 0.025 wt % or less.

4. The method of claim 3, further comprising the step of forming the material with S: 0.025 wt % or less.

5. The method of claim 1, further comprising the step of forming the material with S: 0.025 wt % or less.

6. An anti-friction bearing for electric devices used in office automation equipment, comprising:

an outer ring;

an inner ring;

a plurality of rolling elements disposed between the outer ring and the inner ring, wherein at least the outer ring and the inner ring are made of bearing steel material with a composition including
    C: 0.90–1.30 wt %,
    Si: 0.40–0.90 wt %,
    Mn: 0.90–1.60 wt %, and
    Cr: 0.90–1.70 wt %, wherein the bearing material has been tempered at a temperature in the range of 170° C. and 250° C., such that the amount of retained austenite in a surface layer thereof is less than 6 percent by volume, and a hardness of said surface layer is HRC60 or more, after said tempering.

7. The anti-friction bearing of claim 6, wherein the outer ring has a diameter less than 30 millimeters.

8. The anti-friction bearing of claim 6, wherein the outer ring has a diameter less than 15 millimeters.

9. The anti-friction bearing of claim 6, wherein the material includes 0.025 wt % or less of P.

10. The anti-friction bearing of claim 6, wherein the material includes 0.025 wt % or less of S.

11. The anti-friction bearing of claim 9, wherein the material includes 0.025 wt % or less of S.

12. The anti-friction bearing of claim 7, wherein the anti-friction bearing is for electric devices used in a hard disk drive.

* * * * *